United States Patent [19]

Giroux

[11] Patent Number: 5,002,437

[45] Date of Patent: Mar. 26, 1991

[54] METHOD FOR INSTALLATION AND ALIGNMENT OF A SERIES OF POSTS

[76] Inventor: D. William Giroux, 694 Umpqua Pl., La Conner, Wash. 98257

[21] Appl. No.: 426,100

[22] Filed: Oct. 24, 1989

Related U.S. Application Data

[62] Division of Ser. No. 324,608, Mar. 17, 1989, Pat. No. 4,953,837.

[51] Int. Cl.[5] ........................ E02D 00/00; B23Q 3/00

[52] U.S. Cl. .................................. 405/303; 405/229; 29/464; 29/466

[58] Field of Search .................... 269/43, 45; 405/252, 405/232, 244, 233, 303, 229; 29/281.1, 281.5, 464, 466, 407

[56] References Cited

U.S. PATENT DOCUMENTS 3,897,050 7/1975 Maloblocki .......................... 269/17

*Primary Examiner*—Joseph M. Gorski

*Assistant Examiner*—S. Thomas Hughes

*Attorney, Agent, or Firm*—Zarley, McKee, Thomte, Vorrhees & Sease

[57] ABSTRACT

A method for aligning a series of posts begins with providing a first alignment apparatus adjacent a first hole. A first post is attached to one end of the alignment apparatus and hung at the desired elevation in the post hole. A second alignment apparatus is then provided and one end is connected to the first post such that the alignment apparatus may be swung about the post like a door. Once the second alignment apparatus is positioned in the desired orientation, support members are lowered to support the frame. A second post is then provided and hung on the opposite end of the second alignment apparatus at the desired elevation within a second post hole. The second post is plumed and aligned with respect to the first post upon attachment to the second alignment apparatus. Subsequent alignment apparatus and posts may be attached in a similar fashion to form a series of aligned posts.

2 Claims, 7 Drawing Sheets

METHOD FOR INSTALLATION AND ALIGNMENT OF A SERIES OF POSTS

CROSS REFERENCE TO RELATED APPLICATION

This is a divisional application of Ser. No. 324,608 filed Mar. 17, 1989, now U.S. Pat. No. 4,953,857, entitled "METHOD AND APPARATUS FOR INSTALLATION AND ALIGNMENT OF A SERIES OF POSTS".

TECHNICAL FIELD

The present invention relates generally to apparatus utilized to install posts in the ground, and more particularly to apparatus which will align and plumb a series of posts in equidistant spaced-apart relationship.

BACKGROUND OF THE INVENTION

It is becoming a common occurrence to construct sound barrier walls alongside metropolitan interstate and highway systems in order to reduce the noise level attendant with such road systems. Sound barrier walls are typically constructed of a series of I-beam-shaped concrete posts, having concrete panels interposed therebetween. Because the concrete panels and posts are prefabricated and transported to the site, the location and alignment of the posts and panels is critical to form an effective sound barrier wall.

One of the most difficult problems encountered in constructing the sound barrier wall occurs after the first post has been located and mounted in the ground. Locating the next post and aligning it with the previously mounted post can be a tedious effort in trial and error. Once the additional post has been located, the next difficult task is in aligning the post with relation to the previous post such that the concrete panel fits exactly therebetween and in contact along the entire vertical edges of each end of the panel.

Once alignment has been accomplished, another problem is in providing a post hole of the exact depth necessary so that all posts are at the same height along the wall relative to ground level. In the prior art, this was accomplished by trial and error, removing the post so that the hole would be either partially filled or augered deeper.

It is therefore a general object of the present invention to provide a method and apparatus for locating and aligning a series of posts for a sound barrier wall or the like.

Another object is to provide a method and apparatus for aligning posts which will locate a series of equidistant posts.

A further object of the present invention is to provide a method and apparatus for aligning posts which quickly and easily plumbs a pair of spaced-apart posts in alignment to receive a panel therebetween.

Still a further object of the present invention is to provide a method and apparatus for aligning the height of a series of posts without resorting to trial and error.

Yet another object is to provide a method for locating and aligning posts which is simple to accomplish and quickly performed.

Yet a further object of the present invention is to provide an apparatus for aligning and locating posts which is simple in operation.

These and other objects of the present invention will be apparent to those skilled in the art.

SUMMARY OF THE INVENTION

An apparatus for locating and plumbing a series of posts is provided, which includes a generally vertical frame supported on three operable jacks. Two of the jacks are spaced transversely from one end of the frame and the third jack is connected to the opposite end of the frame, to form a three-point support for the frame. Each jack is operable to raise or lower that support and thereby align and plumb the frame.

The frame includes upper, intermediate and lower horizontal members, vertically spaced-apart and parallel, having ultra high molecular weight polyethylene pads attached at one end. The horizontal members are comprised of a pair of telescoping halves, so as to be selectively and adjustably extensible. A winch and strap is provided proximal to each end of each horizontal member, which is operable to hang a post against the ultra high molecular weight polyethylene pads on one end of the frame, and secure the post on the other end. A continuous series of alignment apparatus and posts may be continuously attached so as to form a completely aligned and plumbed series of posts.

The method for aligning a series of posts begins with providing a first alignment apparatus adjacent a first hole. A first post is attached to one end of the alignment apparatus and hung at the desired elevation in the post hole. A second alignment apparatus is then provided and one end is connected to the first post such that the alignment apparatus may be swung about the post like a door. Once the second alignment apparatus is positioned in the desired orientation, the support members are lowered to support the frame in that position. A second post is then provided and hung on the opposite end of the second alignment apparatus at the desired elevation within a second post hole. Subsequent alignment apparatus and posts may be attached in a similar fashion to create a series of aligned posts. Concrete or other material may then be inserted in the post holes to affixed the posts in their aligned positions. Once the posts are affixed, the alignment apparatus may be removed and the appropriate panels may be inserted between the aligned posts to form a wall.

DESCRIPTION OF THE PREFERRED EMBODIMENT

Figure 1:
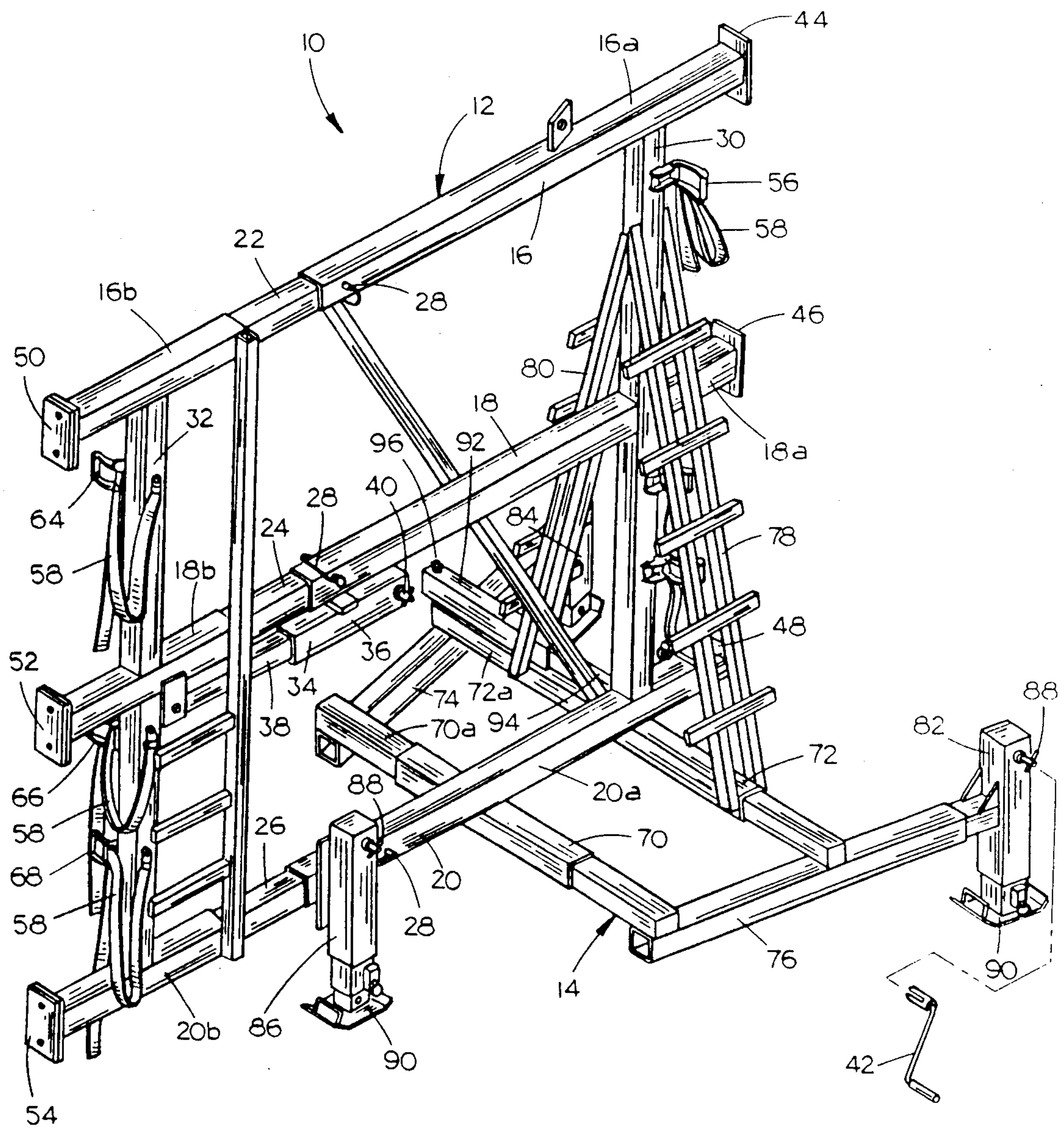
FIG. 1 is a perspective view of the present invention.

Referring now to the drawings, in which identical or corresponding parts are identified by the same reference numeral, and more particularly to FIG. 1, the post alignment apparatus of this invention is designated generally at 10, and includes a generally vertically-oriented frame 12 affixed to a generally horizontally-oriented support frame 14.

Vertical frame 12 includes an upper 16, intermediate 18 and lower 20, horizontal member affixed in parallel relationship. Each horizontal member 16, 18 and 20 is comprised of a pair of telescoping right and left halves 16*a* and *b*, 18*a* and *b*, and 20*a* and *b*, respectively. Telescoping portions 22, 24 and 26 of upper 16, intermediate 18 and lower 20 horizontal members, respectively, are selectively secured together at the desired length using a pin and aperture combination 28, conventional in the art. A right vertical member 30 affixes right halves 16*a*, 18*a* and 20*a* in the appropriate vertically spaced-apart relationship, and a left vertical member 32 affixes left halves 16*b*, 18*b* and 20*b* in appropriate vertically spaced-apart position, as shown in the drawings.

A horizontally-oriented operable jack 34 includes a sleeve portion 36 and adjustable arm 38, sleeve portion 36 being mounted on intermediate member right half 18*a*. Adjustable arm 38 is extensible, and is pivotably connected at its free end to telescoping portion 18*b* of intermediate member 18. A rotatable pin 40 on jack 34, is operable by a handle 42, to selectively extend or retract telescoping portion 18*b*, for a purpose described in more detail hereinbelow.

Figure 6:
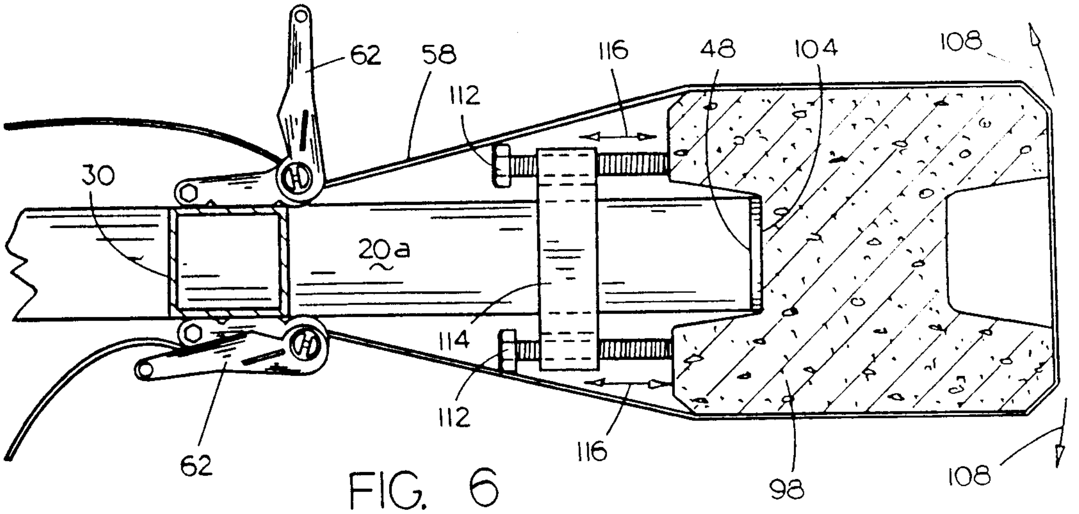
FIG. 6 is a sectional view taken at lines 6—6 in FIG. 3.

Steel pads 44, 46 and 48 are affixed in a vertical plane on the ends of horizontal member right halves 16*a*, 18*a* and 20*a*, respectively, and will abut a vertical surface on a post as described in more detail hereinbelow. Ultra high molecular weight polyethylene pads 50, 52 and 54 are affixed in a vertical plane on the ends of horizontal member left halves 16*b*, 18*b* and 20*b*, respectively, and will abut a vertical surface on a post as described in more detail hereinbelow. A pair of buckle-type winches 56 are operably affixed at the upper end of right vertical member 30 (see FIG. 2), each winch 56 designed to receive and grip one end of a strap 58. Strap 58 is of a length which will reach around a vertical post, as shown in FIG. 6. A second and third pair of winches 60 and 62, respectively, are operably mounted on vertical member 30 in a similar fashion, adjacent horizontal members 18 and 20. Winch pairs 60 and 62 each have a strap 58 associated therewith.

Figure 3:
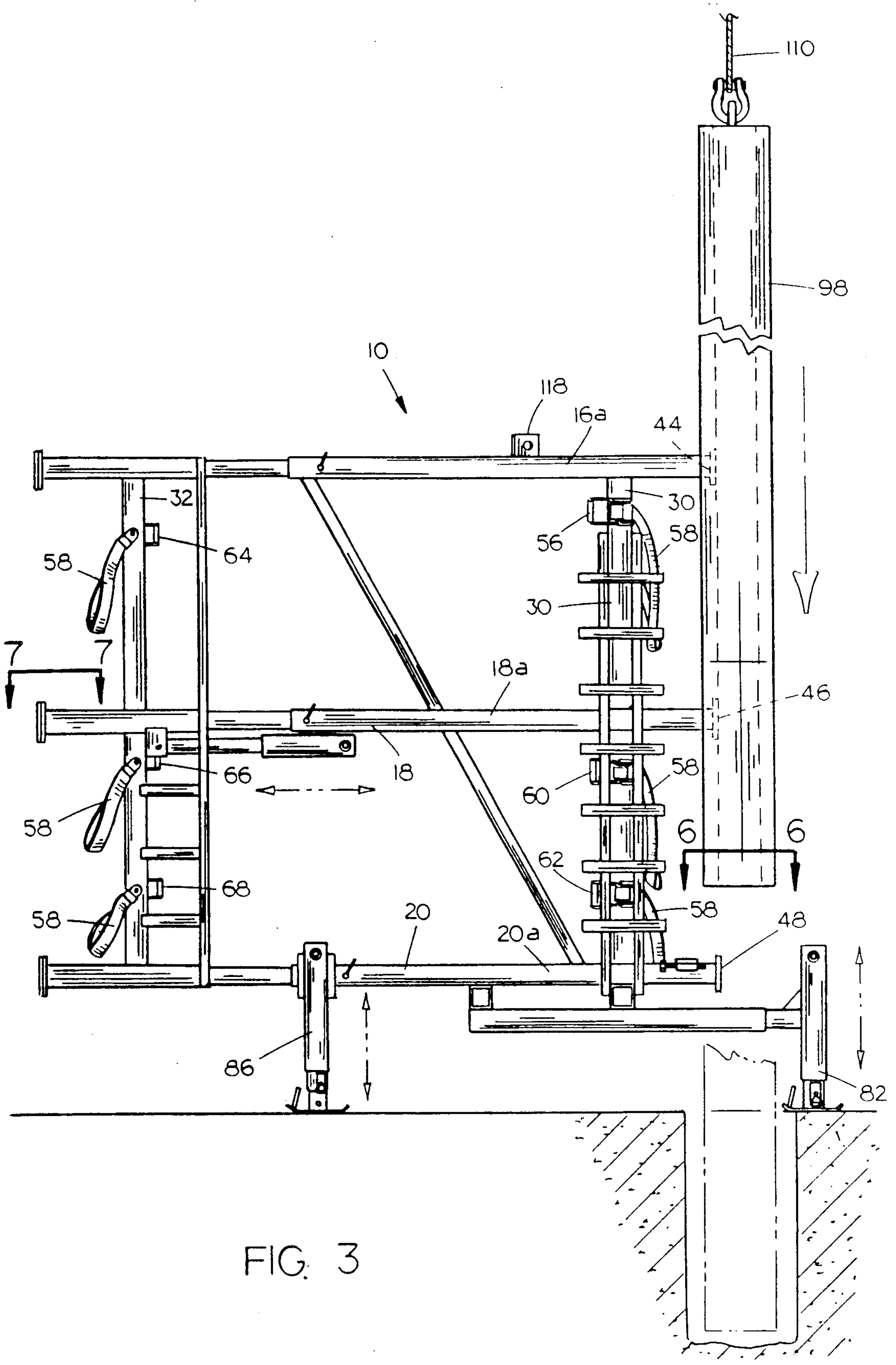
FIG. 3 is a front elevational view of the apparatus of FIG. 1, showing a post being located along one side thereof.

Single winches 64, 66 and 68 are operably mounted along left vertical member 32, adjacent upper, intermediate and lower horizontal members 16, 18 and 20. Each winch 64, 66 and 68 has a strap 58 associated therewith, the straps 58 having one end thereof fastened opposite the winch 64, 66 or 68, as shown in FIGS. 1 and 3.

Support frame 14 includes a pair of left and right transverse members 70 and 72, respectively, affixed to right half 20*a* of horizontal member 20, in parallel relationship. Transverse members 70 and 72 include telescoping portions 70*a* and 72*a*, respectively, with their free ends affixed to rearward leg member 74, as shown in the drawings. A forward leg member 76 is affixed to the opposite ends of transverse members 70 and 72.

A forward structural ladder frame 78 is mounted diagonally between the upper end of right vertical member 30 and adjacent the forward end of transverse member 72. A rearward ladder frame 80 is affixed between the upper end of right vertical member 30 and the rearward end of transverse member 72. Ladders 78 and 80 structurally stabilize vertical frame 12 with respect to horizontal support frame 14, and also assist the user in operating strap 58 and winch 56 at the upper end of vertical member 30.

A vertical jack 82 is mounted to the extending end of forward leg 76, and a second vertical jack 84 is similarly affixed to rearward leg 74. A third vertical jack 86 is affixed to the left end of the right half 20*a* of lower horizontal member 20. In this fashion, jacks 82, 84 and 86 form three support points for supporting the entire alignment apparatus 10. A rotatable pin 88 on each jack 82-86 may be operated by handle 42 so as to raise or lower the foot 90 of the desired jack.

In order to allow for lateral adjustment of legs 74 and 76, second horizontal jack 92 is mounted on the telescoping portion 72*a* of transverse member 72. The adjustable arm 94 of jack 92 has its free end mounted to vertical member 30. Operation of rotatable pin 96 on jack 92 will thereby extend leg 74, and vertical jack 84, with respect to vertical frame 12.

Figure 9:
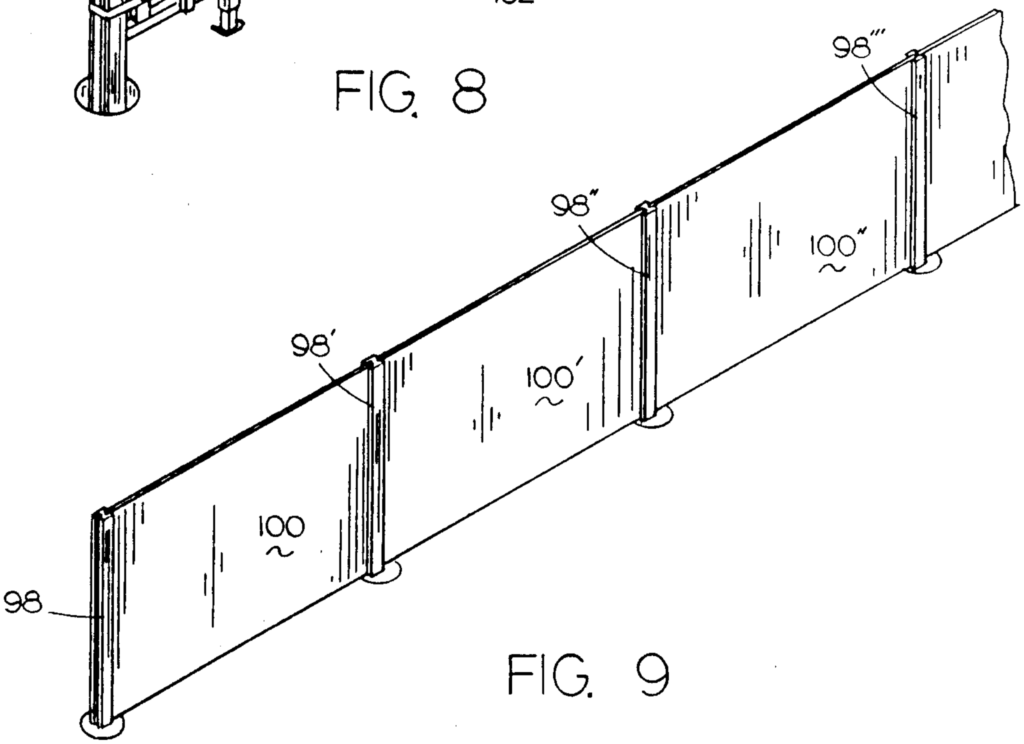
FIG. 9 is a perspective view of a completed sound barrier wall.

Referring now to FIG. 9, the alignment apparatus 10 of the present invention is utilized to set and align a series of concrete posts 98, 98', 98'', etc., so as to receive generally rectangular concrete panels 100, 100', 100'', etc., therebetween. Location and alignment of posts 98 is critical, since panels 100 are precast, and cannot be easily changed to fit non-aligned posts.

Figure 2:
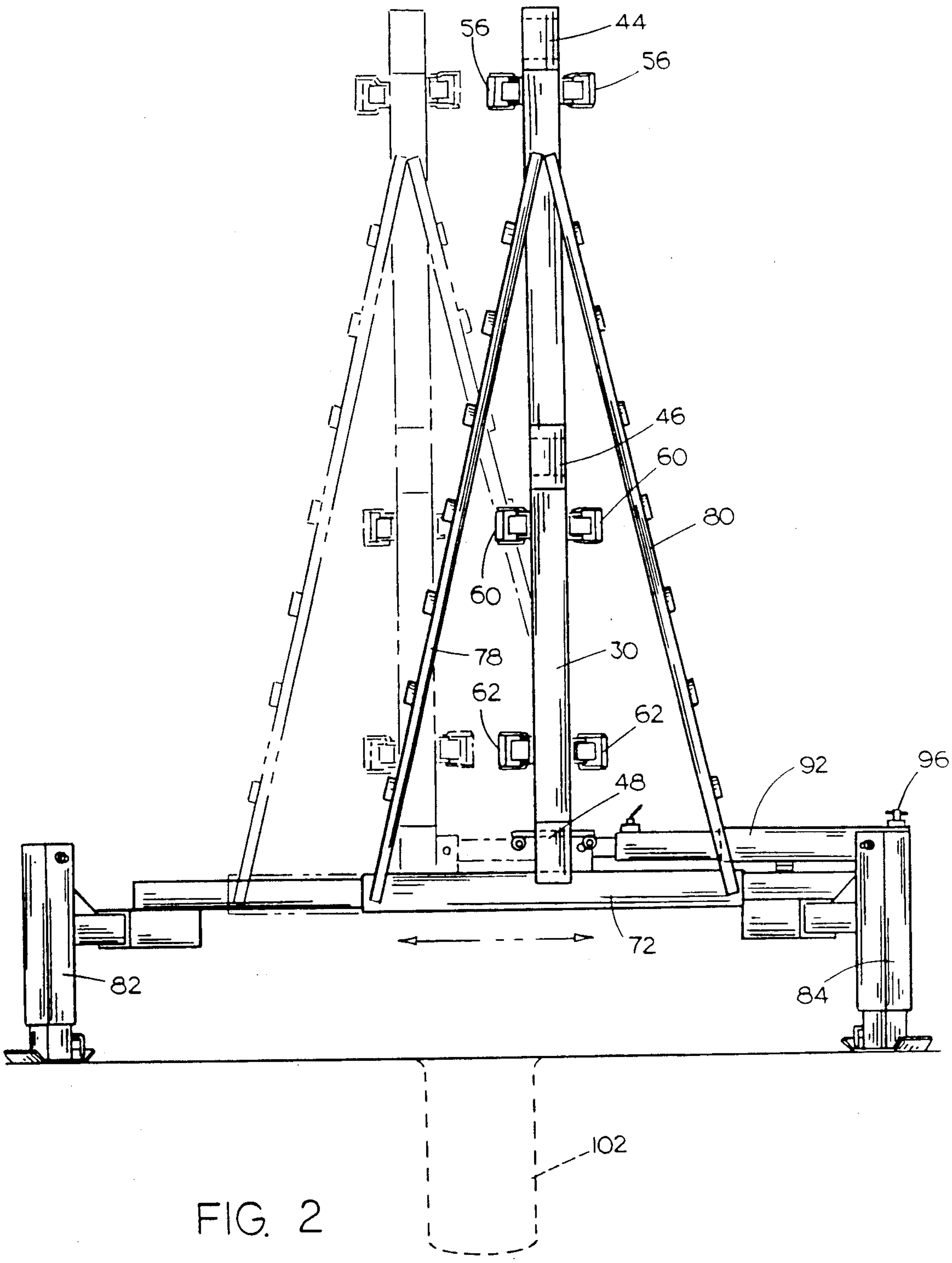
FIG. 2 is an elevational view of the right end of the post alignment apparatus shown in FIG. 1.

The first step in constructing a sound barrier wall, is to auger the first post hole 102 to the required depth. A post alignment apparatus 10 is then placed adjacent hole 102 with steel pads 44, 46 and 48 vertically thereover, as shown in FIG. 3. FIG. 2 shows how horizontal jack 92 may be extended or retracted so as to align vertical member 30 and steel pads 44, 46 and 48 over post hole 102. Alignment apparatus 10 should then be plumbed vertically and horizontally utilizing jacks 82, 84 and 86.

Figure 5:
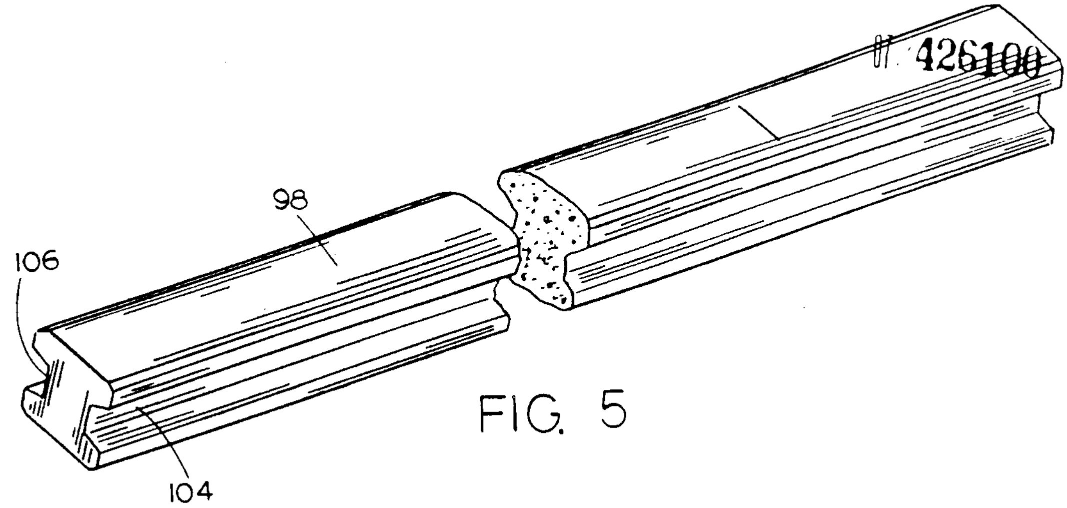
FIG. 5 is a perspective view of a conventional post utilized with the invention.

Referring now to FIGS. 3, 5 and 6, a post 98 is lowered into post hole 102. Each post 98 is generally in the shape of an I-beam, and includes a pair of opposing valleys 104 and 106. Rectangular panels 100 (see FIG. 9) will have its vertical ends abutting the valleys between a pair of posts 98, for a close fit. Post 98 is lowered with valley 104 slidably abutting steel pads 44, 46 and 48, such that the post will be centered within post hole 102. Once post 98 is lowered to the proper elevation, straps 58 are wrapped around the post and tightened by the pairs of winches 56, 60 and 62 on vertical member 30. By tightening more or less on one winch, it is possible to "roll" post 98 about a vertical axis at the end of horizontal members 16*a*, 18*a* and 20*a*, as shown by arrows 108 in FIG. 6.

Once straps 58 are winched snug, the hoist 110 may be removed and the post allowed to hang by straps 58 on winch pairs 56, 60 and 62 at the right end of alignment apparatus 10. A pair of alignment bolts 112 are operably threaded through a bracket 114 mounted on lower horizontal member right half 20*a* adjacent steel pad 48, as shown in FIG. 6. Bolts 112 may be rotated in one direction or the other in order to move the lower end of post 98 as shown by arrows 116, for minute alignment and adjustment.

Figure 4:
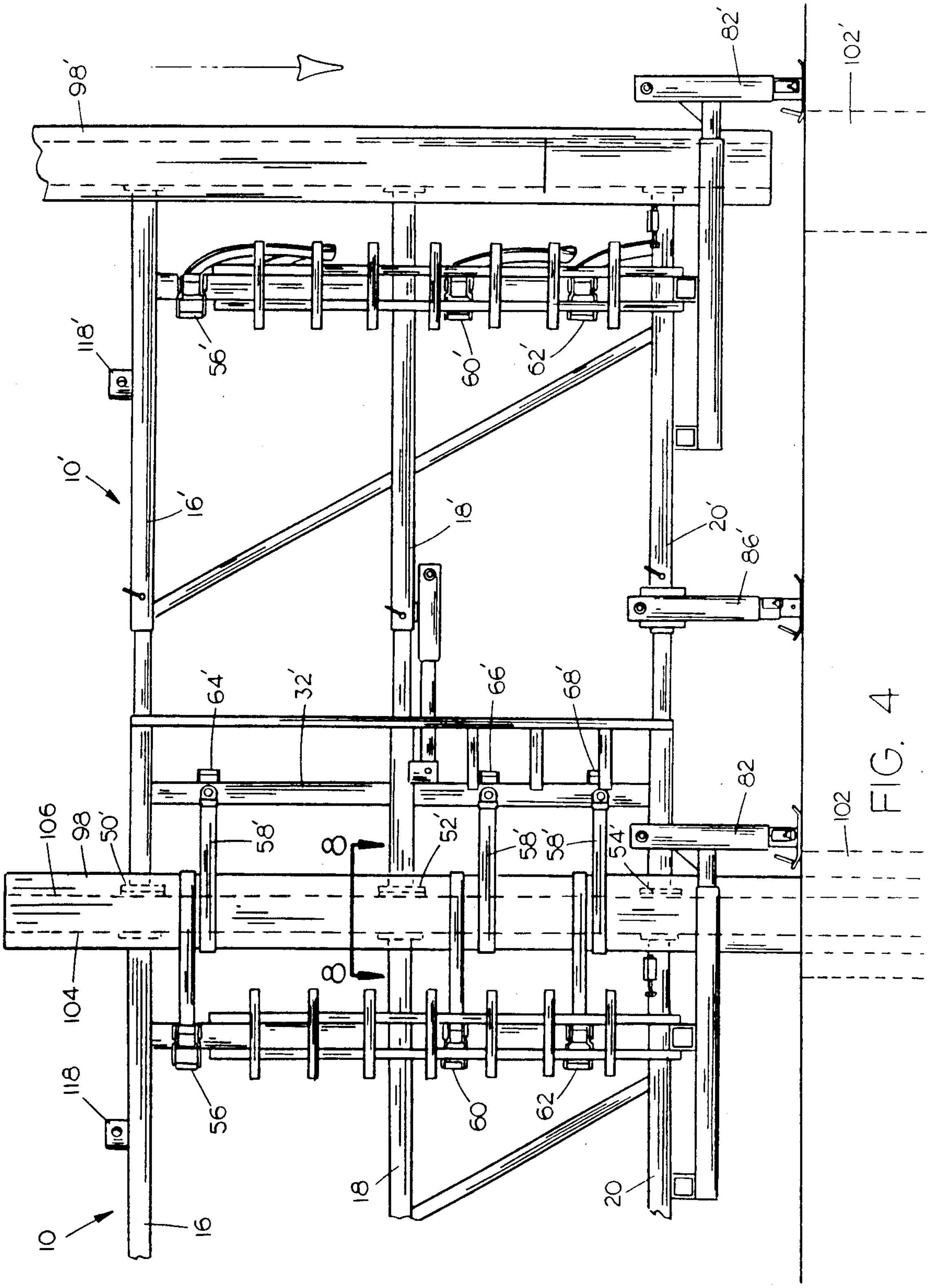
FIG. 4 is a front elevational view of a second alignment apparatus connected to the first alignment apparatus and post, showing the location and alignment of a second post.

Once the first post 98 has been properly positioned and aligned, a second alignment apparatus 10' should be hoisted into position, as shown in FIG. 4. A hoist bracket 118 may be mounted at any convenient location on frame 12, to serve this purpose.

Figure 7:
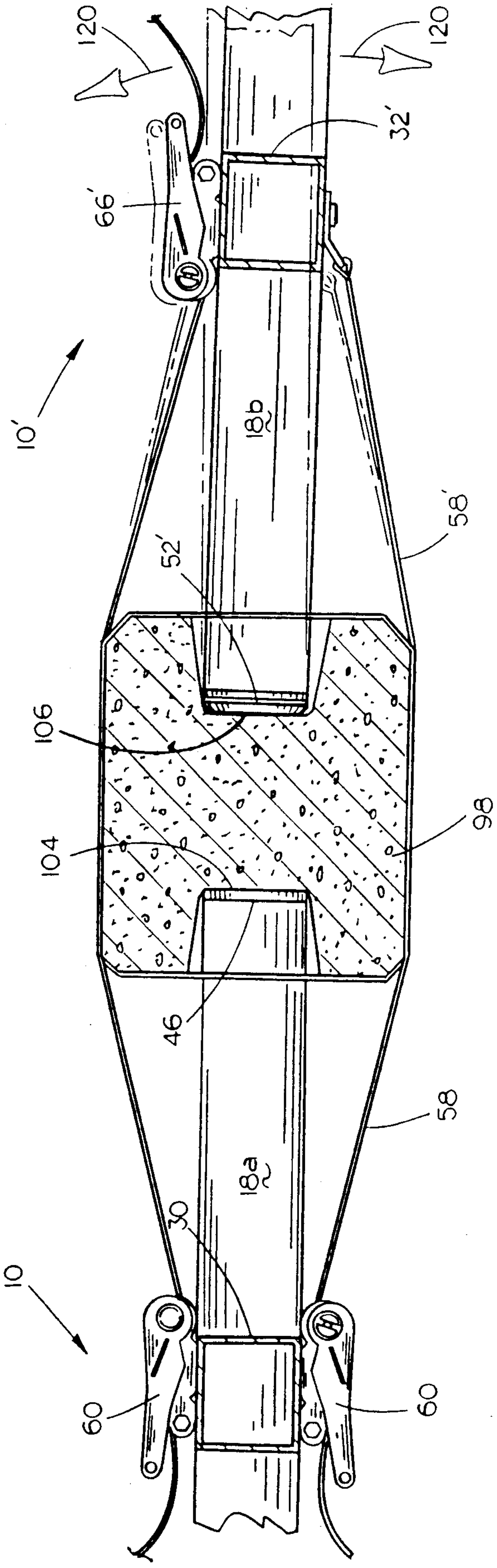
FIG. 7 is a sectional view taken at lines 7—7 in FIG. 4.

Second alignment apparatus 10' is positioned with ultra high molecular weight polyethylene pads 50', 52' and 54' on the left ends of upper, immediate and lower horizontal members 16', 18' and 20', in slidable abutting contact with valley 106 of post 98. Alignment frame 10' is then secured to post 98 utilizing straps 58' and winches 64', 66' and 68' along left vertical member 32'. Once alignment frame 10' is secured to post 98 by straps 58, alignment apparatus 10' may be pivotally swung about post 98 as shown by arrows 120 in FIG. 7 until the apparatus 10' is centered in the appropriate alignment for the continuation of the wall. Once aligned, jacks 82', 84' (not shown) and 86' are lowered to support the frame in position. The hoist may then be removed from hoist bracket 118' and moved to retrieve a second post 98'. Second post 98' is lowered into second hole 102', and is aligned and affixed to the second alignment apparatus 10', in a fashion similar to that previously described for post 98.

Figure 8:
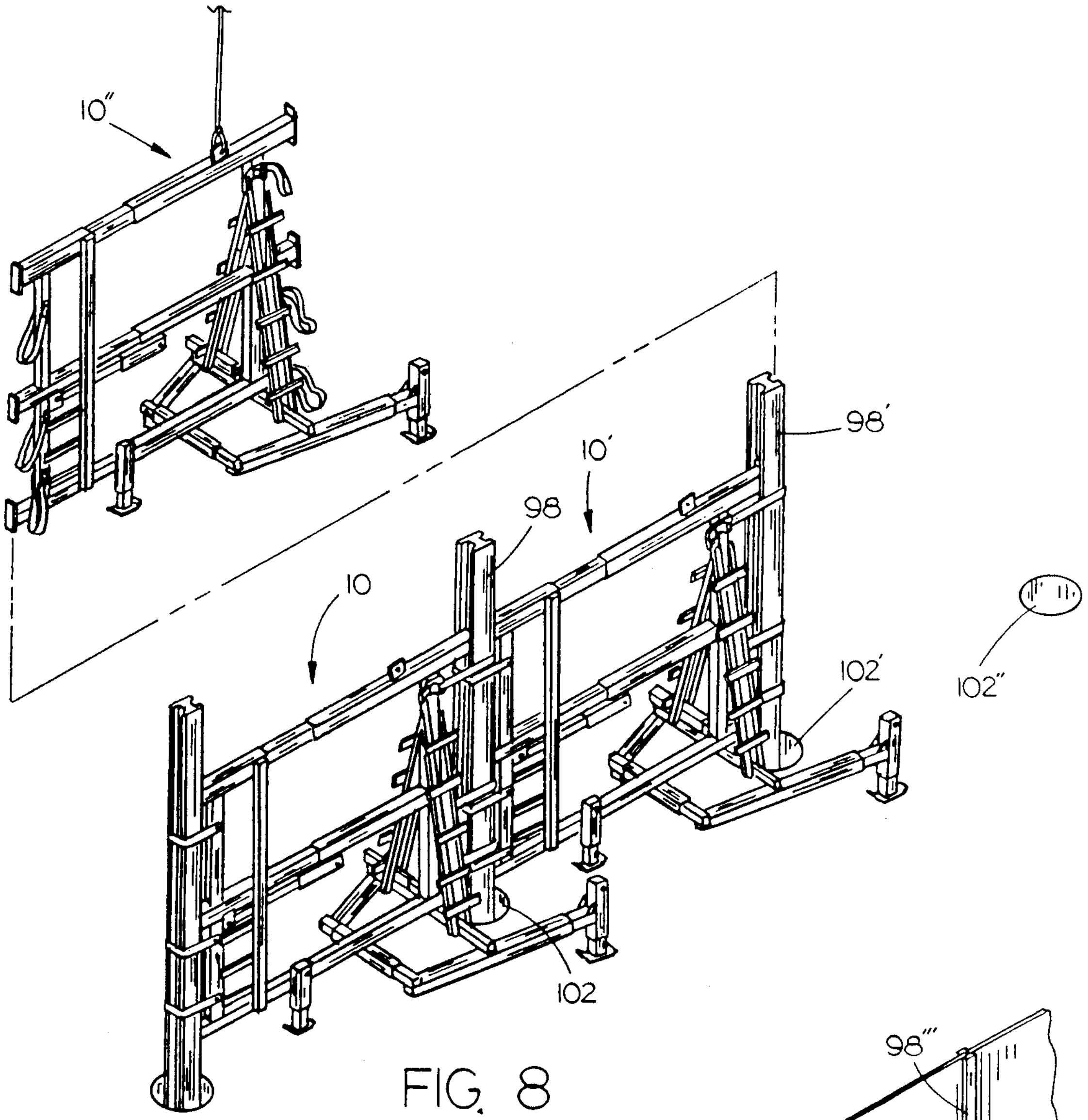
FIG. 8 is a perspective view of a series of the alignment apparatus utilized in constructing a sound barrier wall.

Concrete may be poured around the base of posts 98 and 98', etc. once they have been aligned by frames 10, 10', etc., as shown in FIGS. 8 and 9. Because the posts 98, 98', etc. are hung at the appropriate height at each end of alignment apparatus 10, 10', etc., it is not necessary to constantly auger or fill the post holes to correct the elevation of the posts. Once the concrete has hardened, the frames 10, 10', etc. may be removed, and panels 100, 100', etc. may be inserted.

Whereas the invention has been shown and described in connection with the preferred embodiment thereof, it will be understood that many modifications, substitutions and additions may be made which are within the intended broad scope of the claims. It can therefore be seen that the present invention fulfills at least all of the above-described objectives.

I claim:

1. A method of plumbing a series of posts, comprising the steps of:
 - providing a plurality of alignment apparatuses and posts, each alignment apparatus, including:
   - a frame with first and second ends;
   - operable support members mounted on said frame and operable to be lowered with respect to the frame for supporting the frame above the ground; and
   - attachment means on each end of said frame for selectively, removably attaching a post to each end of said frame;
 - removably connecting a first post on the first end of said frame of a first alignment apparatus, such that said post hangs therefrom with a lower end projecting downwardly within a first post hole;
 - pivotally, removably connecting the second end of a second apparatus to said first post, such that the second apparatus will swing about said first post within a generally horizontal plane perpendicular to said first post;
 - aligning said second apparatus with its first end above a second post hole;
 - lowering said support members on said second apparatus, thereby supporting said second apparatus frame above the ground;
 - removably connecting a second post on the first end of said second frame such that said post hangs therefrom with a lower end projecting downwardly within the second post hole;
 - adjusting said alignment apparatus, thereby aligning and plumbing said second post with respect to the first post;
 - repeating the above steps for successive posts;
 - filling the post holes, thereby affixing the posts after the posts have been aligned and plumbed in position; and
 - removing said alignment apparatus after said posts are affixed.

2. The method of claim 1, further comprising the steps of:
 - pivotally, removably connecting one end of an additional alignment apparatus to an aligned and plumbed post;
 - aligning the additional apparatus with its other end above an additional post hole;
 - lowering support members on the additional apparatus, thereby supporting said additional apparatus frame above the ground;
 - removably connecting an additional post on the other end of said additional apparatus such that said additional post hangs therefrom with a lower end projecting within the additional post hole;
 - adjusting said additional alignment apparatus, thereby aligning and plumbing said additional post with respect to the aligned and plumbed post attached to said one end of the additional alignment apparatus;
 - repeating the above steps for successive posts;
 - affixing each successive post in position after the steps of aligning and plumbing; and
 - removing the alignment apparatus after the posts have been affixed.

* * * * *